May 24, 1927.
H. G. SIBBALD
1,630,140
BAKING RECEPTACLE
Filed Dec. 20. 1924
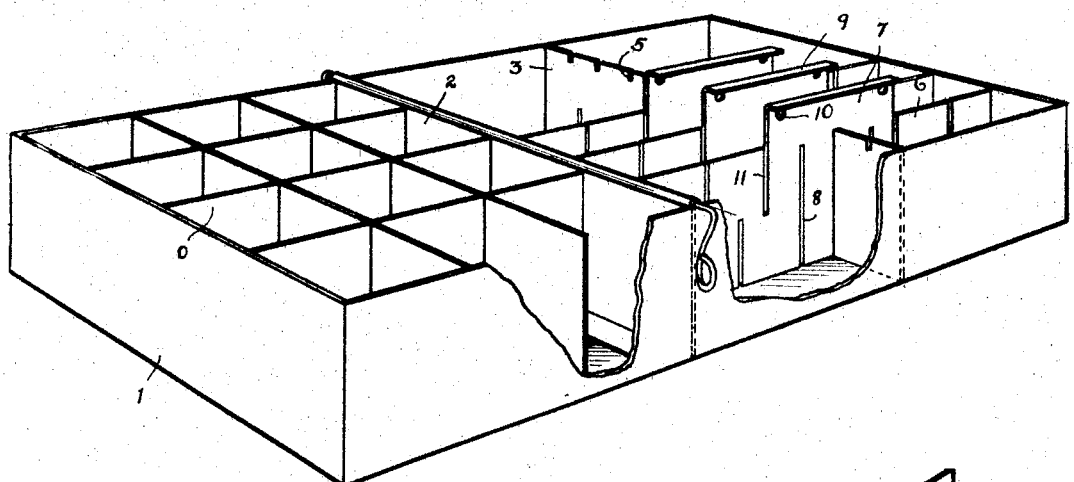
Fig. 1.
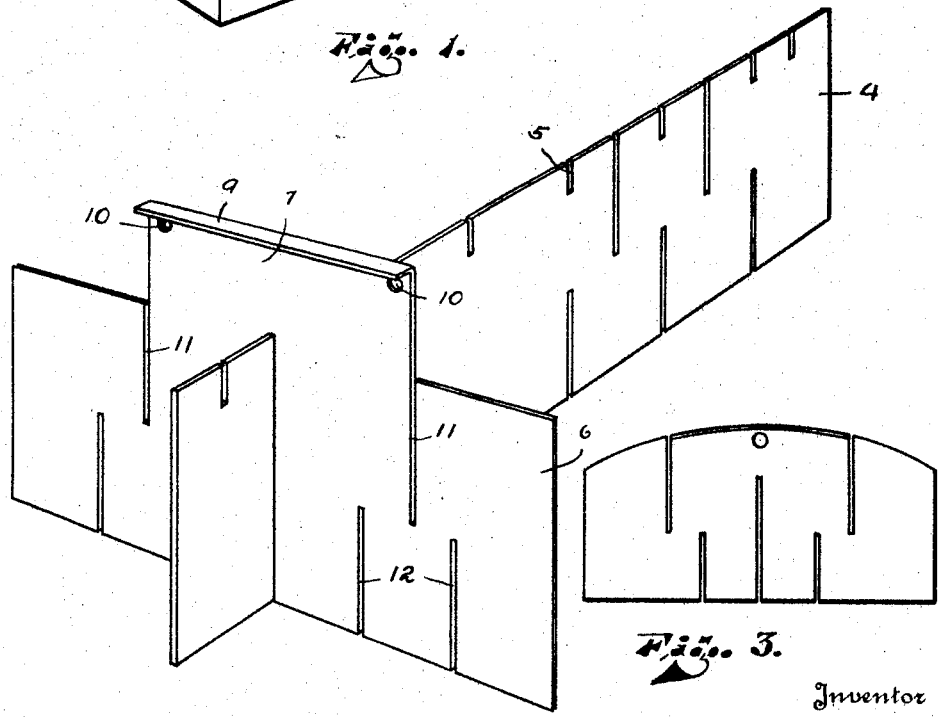
Fig. 2.
Fig. 3.
Inventor
HENRIETTA G. SIBBALD.
By Geo. Stevens
Attorney Patented May 24, 1927.

1,630,140

UNITED STATES PATENT OFFICE.

HENRIETTA G. SIBBALD, OF DULUTH, MINNESOTA.

BAKING RECEPTACLE.

Application filed December 20, 1924. Serial No. 757,092.

This invention relates to baking receptacles and more particularly to such a receptacle having adjustable interior division walls for the baking of cakes of different shapes and sizes.

The principal object is to provide a more conveniently adjustable and manipulated device of this character and one having means whereby a greater variety of different sized and shaped objects may be baked therein.

Other objects and advantages of the novel construction will appear in the further description thereof.

Referring to the accompanying drawing forming part of this application and in which like reference characters indicate like parts:

Figure 1 is a perspective view of a divisible bake pan equipped with the improved arrangement of adjustable partitions; and Figure 2 is an enlarged perspective view of two of the novel division walls or partitions; and Figure 3 is a still further modified form of division wall.

1 represents a rectangularly shaped metal bake pan, the same being provided with a major adjustable division wall 2, such as illustrated in my United States Patent No. 1,500,007, dated July 1st, 1924.

The wall 2 I have illustrated as being positioned in such a manner as to divide the pan into two practically equal portions or compartments, and within the nearer compartment or half of the pan is illustrated a common grouping of removable division walls 0, these division walls being slotted one-half their width from one side for interlocking engagement with each other to form equal compartments, the same being common in the art.

The farther section or compartment of the pan 1 is shown as having a number of novel forms of division walls which it is desired to cover by Letters Patent in this application.

These walls or partitions comprise one or more plain partition walls, having parallel sides, and provided with variously spaced slots upon one or both sides thereof as desired. One of these division walls is illustrated at 3 in Figure 1, and another at 4 in Figure 2, and, while not absolutely essential in the forming of these partitions but a preferred provision in connection therewith, there are a number of relatively shallow notches or slots 5 along one marginal edge thereof, these notches being for selective holding or interlocking engagement with the deeper transverse partitions, such as illustrated at 6. The partitions 6 are of uniform length and in the preferred arrangement equal to one-half the width of the pan, though they may be the entire width to fulfill like requirements in connection with a different assemblage of pan and partitions from that illustrated, and are formed with a deeper central section illustrated at 7 which projects considerably above the upper marginal edge of the partition.

This deeper central portion of the partitions is for the purpose of providing means whereby one or more deep or practically full depth slots may be formed therein, such slots being illustrated at 8, and, as before stated, there may be one or more of such deep slots depending upon the requirements to be fulfilled by the partitions. Furthermore this greater width in the centermost section of the partitions provides an upstanding portion convenient of manipulation by the fingers of the operator for positioning the partitions in the desired places longitudinally of the partitions with which they are assembled. In this connection I have shown these deeper partitions as resting within the notches 5 on the upper edge of the cooperative partitions, this being for the purpose of providing selective uniform distances for the spacing of the partitions.

The uppermost horizontal edge of the central extension of the partitions 6 is turned at right angles as illustrated at 9 providing a lip or projection not only for more convenient handling but to increase the rigidity of the partitions, and adjacent each uppermost corner of this elevated section I have illustrated a hole 10 so that a wire, hook, or fork tine may be readily inserted therein for raising the partitions in the event of same being too hot or otherwise inconvenient of manipulation, and furthermore providing means for holding, hanging or stringing same when not being used.

At the junction of the elevated upwardly extending portion 7 with the major portion 6 of such partition, I have shown downwardly extending slots 11 which may be employed in interlocking engagement either with common partition walls such as illustrated at 0 which are slotted one-half their width or with such partition walls as that illustrated at 4 which may be slotted from one or both sides as desired.

By this arrangement and spacing of slots it will be seen that the spaces intermediate of the ends of the partition 6 and the slots 11 are equal to those spaces existing between the slots 11 and the centermost slot so that cakes of equal dimensions laterally may be baked.

In the lower side of the partition 6 as illustrated in Figure 2 I have shown other spaced slots 12 which, being differently spaced, permit of a different arrangement of partitions to produce different sized cakes, and, as is obvious, other spaces and arrangements of slots may be resorted to without departing from the spirit of the invention.

By the use of these deeper partitions irrespective of the slotted arrangement of the transverse partitions, they may be spaced in any manner desired or any number used within the pan to form oblong cakes such as known in the art as finger cakes, or, when a number of partitions, such as those shown at 0, 3 and 4 are used in closely spaced relation in connection with the deeper partitions, the finger or oblong cakes may be formed with their greater dimension running at right angles to the deeper partitions.

While I have shown in the nearer section of the pan 1 an assemblage of what is referred to as the common partitions, slotted only upon one side and interlockingly engaged, it is evident that partitions such as shown at 4 in Figure 2, being slotted upon both sides, may be employed, and that without the use of the deeper partitions 6, and such partitions 4, being slotted upon both sides, permit of the assemblage of same in a quite different manner from the common partitions which are slotted only upon one side. For example, with partitions having slots on both sides the centermost partition in a group may be upside down in respect to all the other partitions and thereby made to support same in raising and lowering a group or nest from the pan.

From the foregoing it is apparent that almost numberless selections are possible as to shapes or sizes and numbers of cakes to be baked and may be resorted to especially by forming differently spaced slots either in the uniform partitions or the deeper partitions or both.

In Figure 3 is shown an abnormally deep division wall, the extreme ends of which are the same depth as the pan or the walls used in cooperative connection therewith, while the centermost deeper portion is shown in arcuate form for convenience of manipulation; it being understood that this abnormal depth for convenience of manipulation of the partitions may occur in a plurality of places in preference to the centermost single one, if so desired.

Having thus described my invention, what I claim and desire to secure by Letters Patent, is:

The combination with a baking receptacle of the character described having adjustable partitions with spaced slots therein, of a partition greater in width than said adjustable partitions having slots therein for interlocking engagement with said adjustable partitions, and also slots therein for wholly straddling said adjustable partitions.

In testimony whereof I hereunto affix my signature.

HENRIETTA G. SIBBALD.